United States Patent [19]

Sakurai et al.

[11] Patent Number: 4,633,735
[45] Date of Patent: Jan. 6, 1987

[54] AUTOMOBILE DIFFERENTIAL GEAR SYSTEM

[75] Inventors: Masao Sakurai, Ohbu; Yousuke Hamada, Kariya; Morimasa Ninomiya, Nagoya; Toshihide Takechi; Kunihiro Nakagawa, both of Kariya; Takashi Fujii, Chiryu, all of Japan

[73] Assignee: Nippondenso Co., Ltd., Kariya, Japan

[21] Appl. No.: 790,529

[22] Filed: Oct. 23, 1985

[30] Foreign Application Priority Data

Oct. 24, 1984 [JP] Japan .................. 59-223639

[51] Int. Cl.$^4$ ............................. F16H 37/06
[52] U.S. Cl. ..................... 74/675; 180/244; 180/247
[58] Field of Search ............... 180/244, 247; 74/710.5, 74/711, 675, 665 M, 388 PS

[56] References Cited

U.S. PATENT DOCUMENTS 3,519,314  7/1970  Ballard ..................... 180/244 X
4,549,448 10/1985  Kittle ....................... 74/710.5
4,593,358  6/1986  Takeshima et al. ...... 74/388 PS X

FOREIGN PATENT DOCUMENTS 55-14344  1/1980  Japan .

Primary Examiner—Kenneth J. Dorner
Assistant Examiner—Alan G. Towner
Attorney, Agent, or Firm—Cushman, Darby & Cushman

[57] ABSTRACT

An automobile differential gear system capable of establishing an appropriate differential motion between the right and left driving axles of an automobile so that the automobile is able to run smoothly along a curve where the right and left driving axles are required to be driven at different revolving rates respectively. The system comprises a differential gear, a steering angle detecting unit for detecting a steering angle, a driving speed detecting unit for detecting the speed of the differential gear case, a pinion speed control unit which provides a control signal for controlling the differential motion of the right and left driving axles of the automobile, and a pinion driving unit for rotating the pinions to control the respective revolving rates of the right and left driving axles according to the control signal so that correct and quick response of the movement of the automobile to steering operation is achieved.

4 Claims, 15 Drawing Figures

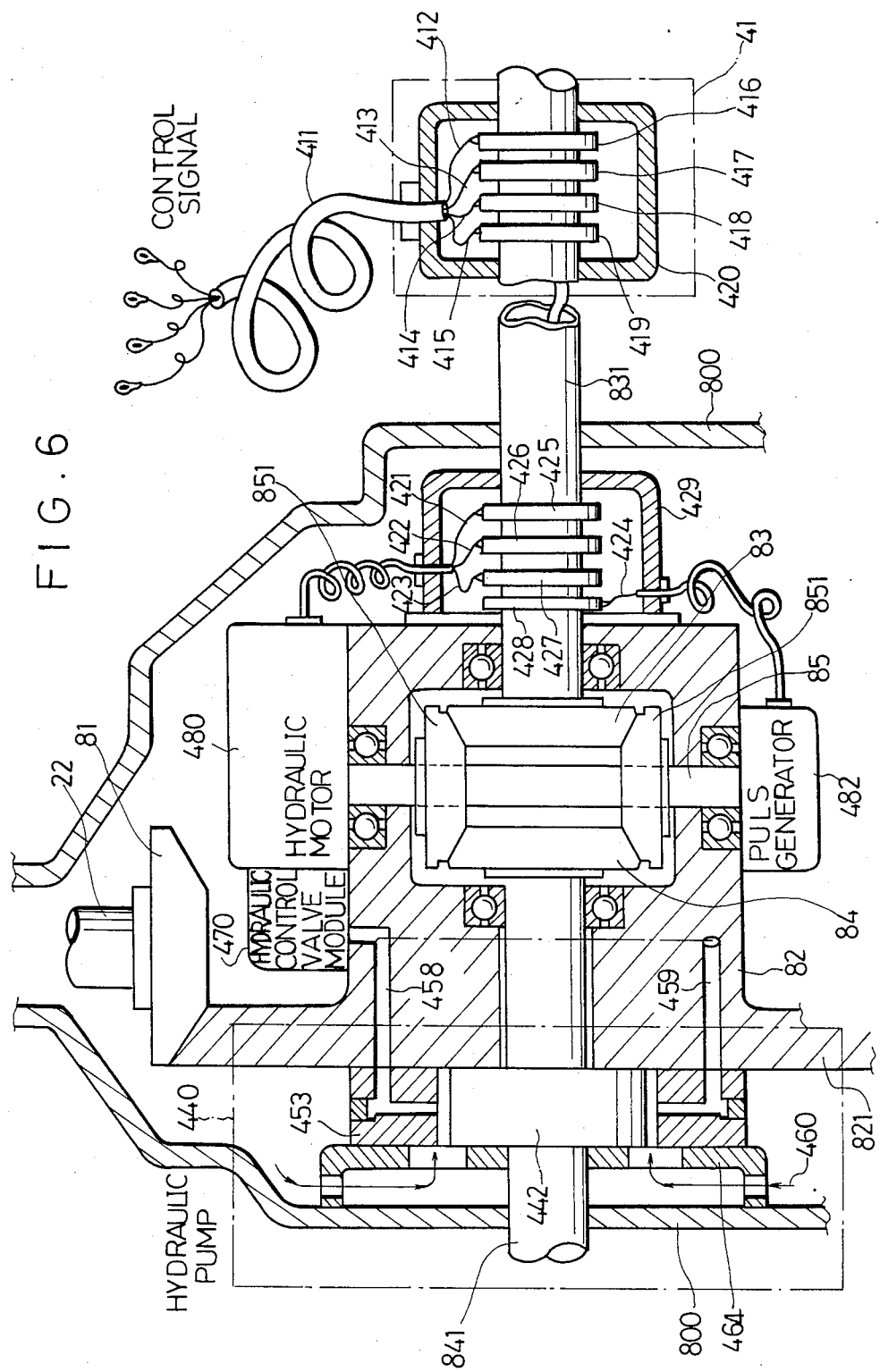

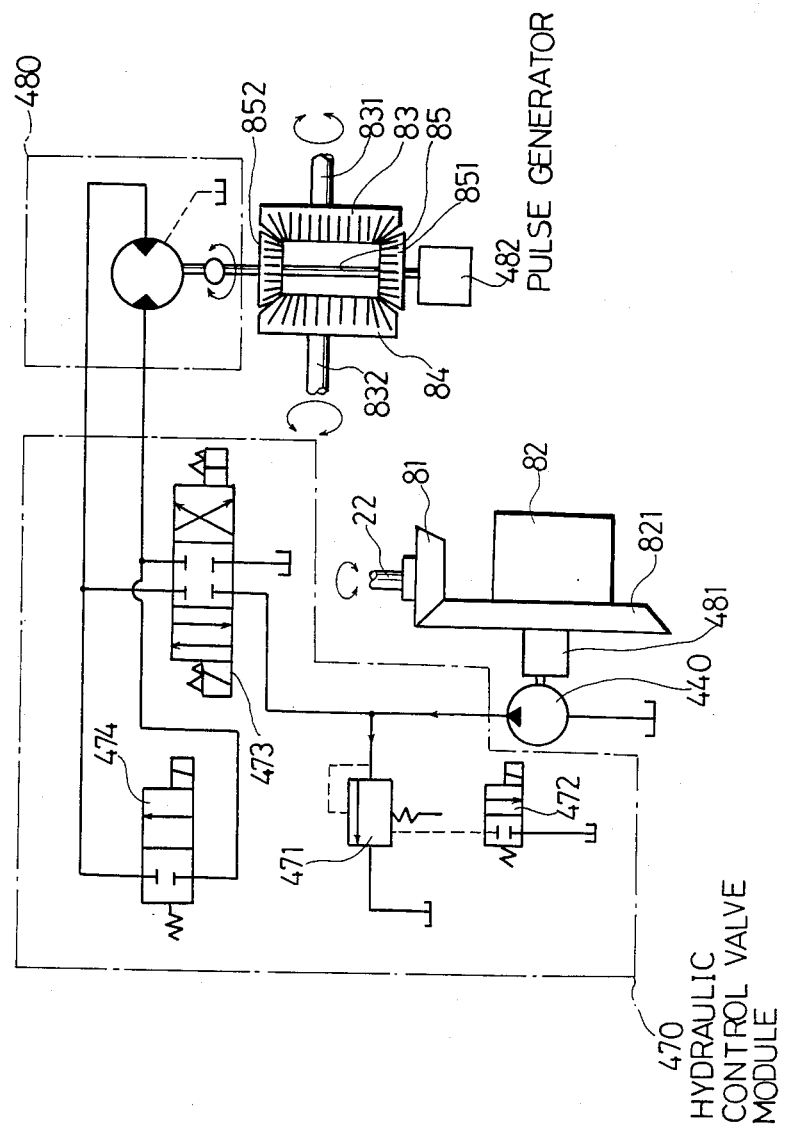

AUTOMOBILE DIFFERENTIAL GEAR SYSTEM

BACKGROUND OF THE INVENTION

1. Field of the Invention

The present invention relates to an automobile differential gear system capable of detecting steering angle and positively regulating the right and left rear axles of the automobile to enable the automobile to run smoothly.

2. Description of the Prior Art

The conventional differential gear is designed to drive the right and left driving axles by the same torque. Therefore, when different frictional resistances act on the wheels fixed to the right and left driving axles, the revolving rate of the driving axle connected to the wheel on which a smaller frictional resistance is acting is higher than that of the driving axle connected to the wheel on which a greater frictional resistance is acting.

When the steering wheel of an automobile is turned, the direction of the front wheels is shifted, and then the direction of the body is changed by the propelling power of the driving wheels. Accordingly, a greater frictional resistance acts on the inner rear wheel, while a smaller frictional resistance acts on the outer rear wheel, and hence the outer rear wheel rotates at a revolving rate higher than that of the inner rear wheel. Since the running direction of an automobile is changed by such a subordinate frictional phenomenon, the minimum turning radius of an automobile is dependent on the structural factors, such as size, of the automobile, and hence the minimum turning radius cannot be changed.

The differential motion of the rear wheels is due to the shift of the direction of the front wheels and the resultant difference between the right and left rear wheels in frictional resistance that acts on the rear wheels, and hence the differential motion of the rear wheels is subject to the movement of the front wheel. Accordingly, there is a fixed time-lag between steering motion and the response of the direction changing movement of the automobile. Therefore, a driver of an automobile is required to operate the steering wheel in expectation of a running course of the automobile. Accordingly, the driver often fails in judging correct running course when the automobile is running on an alley, and is often obliged to operate the steering wheel again to correct the running direction of the automobile.

In running on a frozen road, the steering wheel is apt to be turned excessively in correcting the direction of the automobile by countersteering when the automobile drifts diagonally due to slip, if the response of the movement of the automobile to the steering action is delayed.

These problems that occur while the automobile is running can be solved by the enhancement of the function of the differential gear, however, any differential gear capable of solving such problem has not been developed so far.

SUMMARY OF THE INVENTION

Accordingly it is an object of the present invention to improve the manuverability of an automobile through the improvement of the response and sensitivity of running direction changing motion of the automobile to steering operation by positively regulating the respective revolving rates of the right and left rear axles according to steering angle.

The object of the present invention is achieved by an automobile differential gear system comprising:

a differential gear mechanism including a differential gear case to which a torque of the propeller shaft is transmitted through a gear wheel, pinions (differential small wheels) a mounted on the differential gear case for revolution together with the differential gear case and for rotation on their axes, and a right and a left gear wheels capable of being rotated by the composite rotative action of the rotation of the pinions and the revolution of the differential gear case;

a steering angle detecting unit for detecting a steering angle;

a driving speed detecting unit for detecting the revolving speed of the differential gear case;

a pinion speed control unit which receives signals from the steering angle detecting unit and the driving speed detecting unit and provides a control signal corresponding to the input signals for controlling the differential rotation of the right and left gear wheels; and a pinion driving unit for rotating the pinions to control the respective revolving speeds of the right and the left gear wheels according to the control signal given thereto by the pinion speed control unit.

The above and other objects, features and advantages of the present invention will become more apparent from the following description of the preferred embodiments thereof taken in connection with the accompanying drawings.

BRIEF DESCRIPTION OF THE DRAWINGS

FIG. 6 is a sectional view of the automobile differential gear system employed in the embodiment of FIG. 2;

FIG. 8 is a circuit diagram of a hydraulic circuit employed in the embodiment of FIG. 2;

DESCRIPTION OF THE PREFERRED EMBODIMENTS

Figure 1:
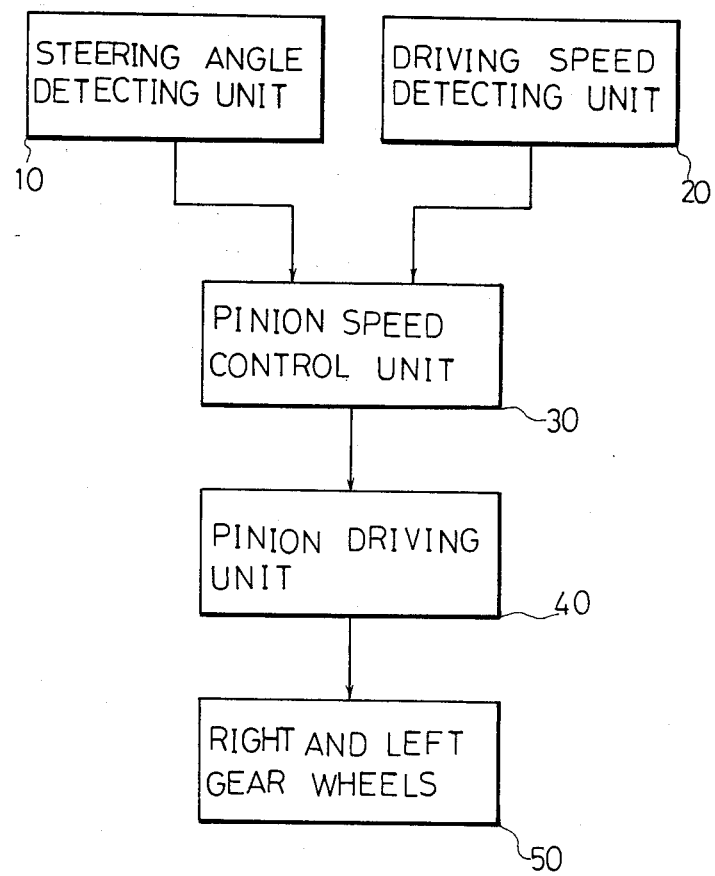
FIG. 1 is a block diagram showing the inventive conception of an automobile differential gear system according to the present invention.

Prior to the description of the preferred embodiments of the present invention, the conception of the present invention will be described with reference to FIG. 1.

A steering angle detecting unit 10 provides an electric signal corresponding to a steering angle. As the steering angle detecting unit is used a well known mechanism or device. For example the device may contain an amplifying mechanism for mechanically amplifying the rotation of the steering shaft and a potentiometer for converting the amplified rotation to an electric signal. The device may be a well known electric device which reads a position data sticked to the circumference of the steering shaft and processes the position data taking into consideration the amount of rotation of the steering shaft. The steering angle detecting unit 10 may include an electric circuit for processing a signal detected, if necessary.

A driving speed detecting unit 20 detects the rotational speed of the differential gear case. The driving speed detecting unit 20 can detect the revolving speed rate of the propeller shaft of the automobile.

A pinion speed control unit 30 calculates the respective revolving speeds of the right and left gear wheels by processing signals given thereto by the steering angle detecting unit 10 and the driving speed detecting unit 20 for the smooth running of the automobile, and provides a control signal to a pinion driving unit 40 which rotates the pinions against the differential gear case for rotating the right and left gear wheels at their respective revolving speeds.

The pinion driving unit 40 may be, for example, an electric motor adapted to rotate the pinions of the differential gear. Or the pinion driving unit 40 may be a hydraulic motor driven by hydraulic fluid supplied by a hydraulic pump.

A right and left gear wheels 50 are caused to perform a differential motion by a combined action of the torque of a propeller shaft transmitted from the engine of the automobile and the torque of the pinion driving unit 40.

The steering angle which varies momentarily while the automobile is running is detected by the steering angle detecting unit 10. The steering angle detecting unit 10 gives a detection signal to the pinion speed control unit 30.

The driving speed detecting unit 20 detects the speed of the differential gear case and gives a corresponding signal to the pinion speed control unit 30.

The pinion speed control unit 30 calculates the respective revolving speeds of the right and left gear wheels on the basis of the signals give thereto by the steering angle detecting unit 10 and the driving speed detecting unit 20, and gives a control signal corresponding to the results of the calculation to the pinion driving unit 40.

The pinion driving unit 40 rotates the pinions to control the differential motion between the right a left the differential gears 50 according to the control signal given thereto by the pinion speed control unit 30.

The right and left differential gears 50 perform a positive differential motion corresponding to the steering angle and the driving speed of the differential gear case. Consequently, the sensitivity and response of the automobile to steering operation is improved.

The present invention will be described more concretely hereinafter with reference to a first embodiment thereof.

Figure 2:
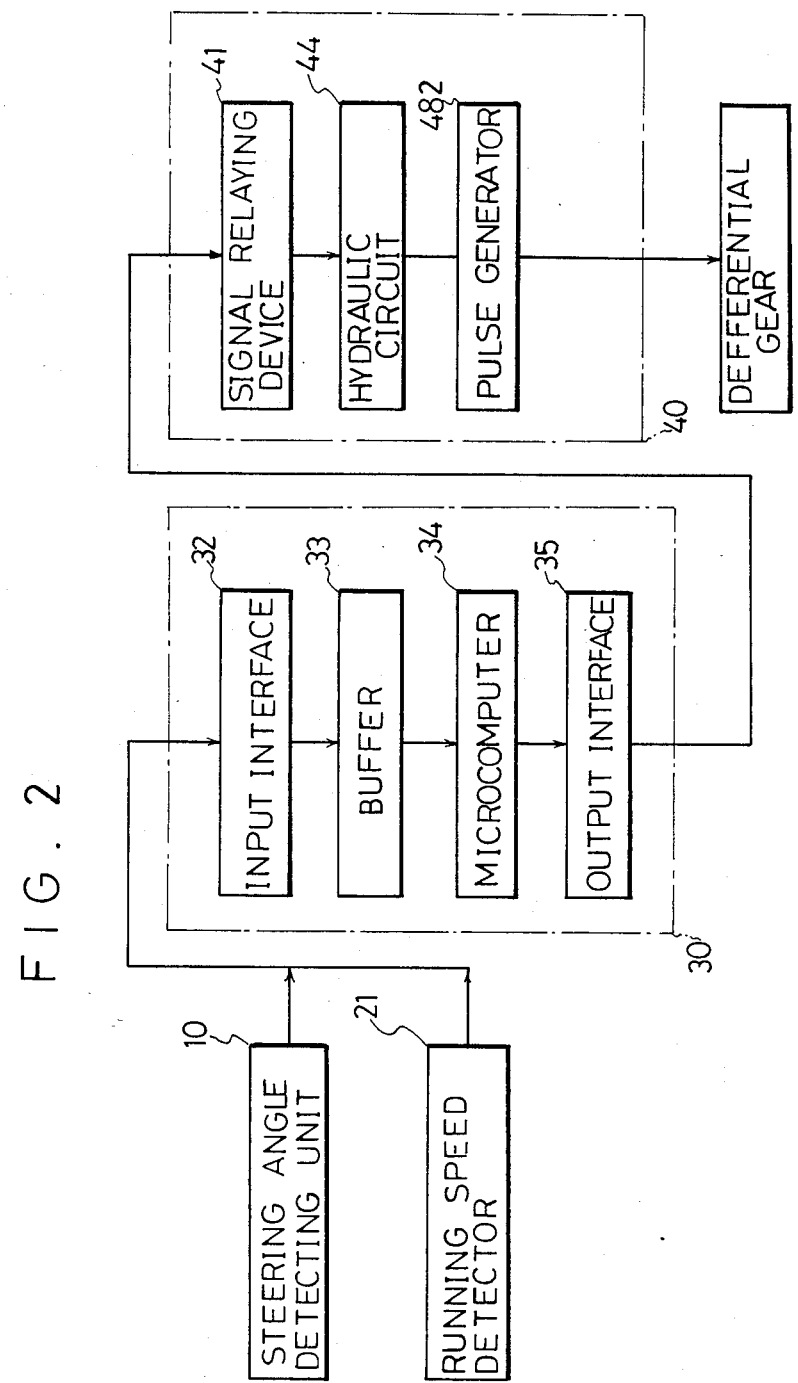
FIG. 2 is a block diagram showing the constitution of an automobile differential gear system, in a first embodiment, according to the present invention.

FIG. 2 is a block diagram showing the constitution of an automobile differential gear system, in a first embodiment, according to the present invention.

Figure 3:
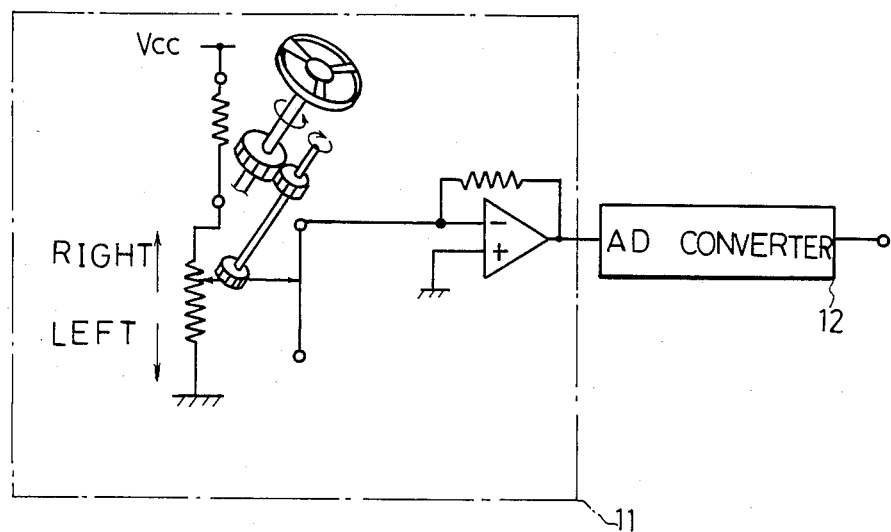
FIG. 3 is a block diagram of a steering angle detecting unit employed in the automobile differential gear system of FIG. 2.

A steering angle detecting unit 10 comprises a steering angle detecting head 11 and an AD converter 12 as shown in FIG. 3.

FIG. 3 is a block diagram of the steering angle detecting unit 10.

The construction of the steering angle detecting head 11 is illustrated in FIG. 4(a). The steering angle detecting head 11 detects a steering angle through the measurement of the amount of rotation of a steering shaft 111.

The rotation of the steering shaft 111 is amplified mechanically by gear wheels 112 and 133, and then the amplified rotation is transmitted to a slider driving shaft 114 provided with an external thread. As the slider driving shaft 114 rotates, a slider 115 engaging the slider driving shaft 114 moves along a resistance surface 116 formed by spreading a uniform resistance body and along a sliding surface 117. The steering shaft 111 is supported in a rolling bearing 118, while the slider driving shaft 114 is supported in rolling bearings 119 and 120. FIG. 4(c) is a cross-sectional view of a slider case 121, square grooves 123 and 124 for slidably guiding the slider 115 are formed in the opposite walls of the slider case 121. As illustrated in FIG. 4(b), the resistance surface 116, the slider 115 and the sliding surface 117 form an electric circuit. An electric signal corresponding to a steering angle is provided through terminals 126 and 127. The steering angle detecting head 11 provides an analog electric signal corresponding to a steering angle within the entire range of rotation of the steering shaft 111.

The AD converter 12 converts the electric signal given thereto by the steering angle detecting head 11 into zero, a positive digital value, or a negative digital value, when the steering shaft is at an angular position corresponding to straight running, rightward turn, or leftward turn, respectively, of the automobile.

Figure 5:
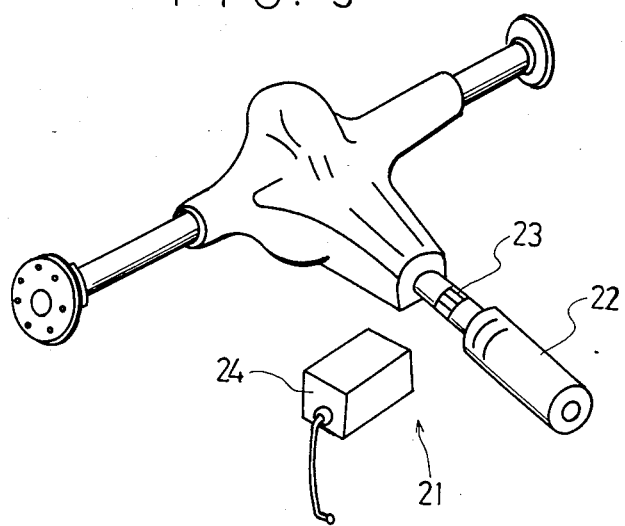
FIG. 5 is a perspective view showing the disposition of a driving speed detector employed in the embodiment of FIG. 2.

FIG. 5 illustrates a running speed detector 21 serving as the driving speed detecting unit 20. The running speed detector 21 includes a magnetic tape 23 carrying position data and sticked to a propeller shaft 22 for transmitting an engaging torque to the differential gear, and a magnetic tape reader 24. The magnetic tape reader 24 reads the position data varying according to the rotation of the propeller shaft 22, calculates the direction and the running speed of the automobile, and converts the results of the calculation into corresponding digital signals. The pinion speed control unit 30 includes an input interface 32, a buffer 33, a microcomputer 34 and an output interface 35.

The pinion driving unit 40 comprises a signal relaying device 41 for transmitting a control signal provided by the pinion speed control unit 30 to a hydraulic circuit 44 and a pulse generator, which will be described later.

The constitution of the pinion driving unit 40 will be described in detail hereinafter with reference to FIG. 6.

Figure 4:
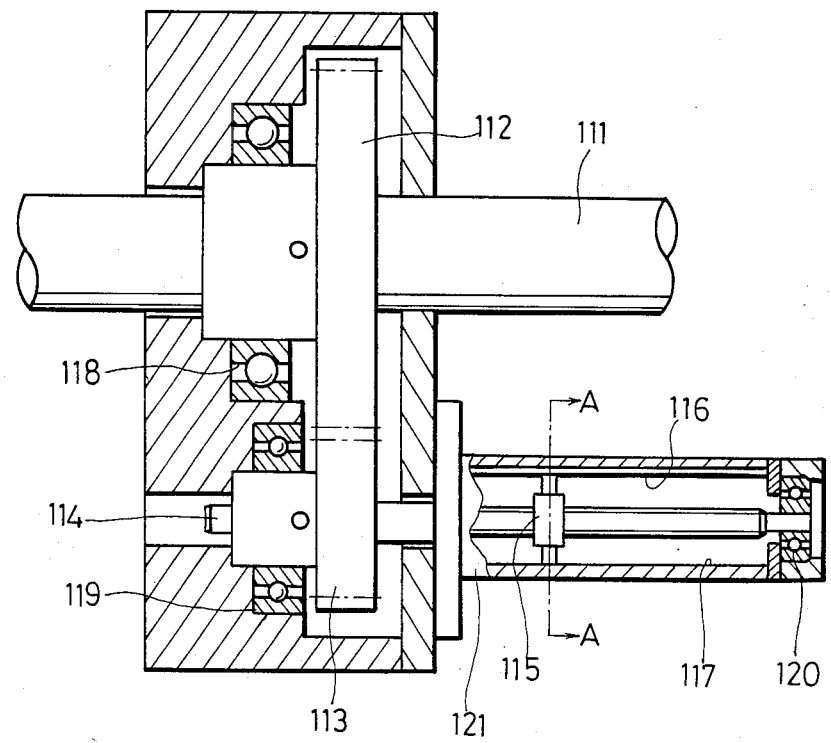
FIG. 4(a) is a sectional view of the steering angle detecting unit employed in the embodiment of FIG. 2.
FIG. 4(b) is a circuit diagram of a circuit for generating an electric signal.
FIG. 4(c) is a sectional view taken along line A—A of FIG. 4(a).
Figure 4:
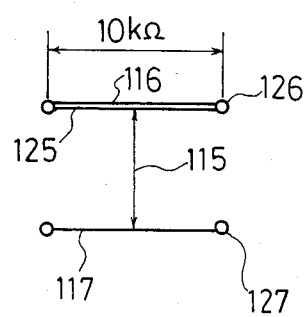
Figure 4:
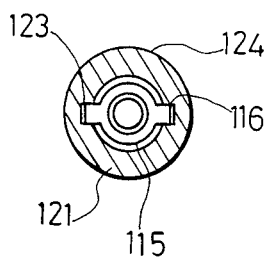

FIG. 4 is a sectional view of the differential gears and the pinion driving unit 40 employed in the first embodiment. The differential gears comprises a differential gear case 82 with a final large driving gear 821, a right gear wheel 83, left gear wheel 84 and two pinions 851, 852. The differential gear case 82 is connected to the propeller shaft 22 through a final small driving gear fixed to an end of the propeller shaft 22 and the final large driving gear 821. The right gear wheel 83 is fixed to an end of a right rear axle 831 and the left gear wheel 84 is fixed to an end of a left axle 841. The right and left axles 831, 841 hold the differential gear case 82 rotatably and are held rotatably with an oil pan 800. The pinion 851 and 852 are fixed to a pinion shaft 85 which is held rotatably within the differential gear case 82. The right and left gear wheels 83, 84 are connected through the pinions 851 and 852 which are positioned between the right and left gear wheels 83, 84. The construction of the differential gear case 82, the right and left gear wheels 83, 84 and the pinions 851, 852 is the same as that of the conventional differential gears.

The signal relaying device 41 of the pinion driving unit 40 comprises a primary signal relaying unit including slip rings 416 to 419 fixed to the right axle 841 of the automobile so as to rotate together with the right rear axle 841, brushes 412 and 415 in sliding contact with the slip rings 416 to 419 respectively for electrically connecting a signal cable 411 to the slip rings, and an electrode housing 420; and a secondary signal relaying unit including slip rings 425 to 428 which rotate together with the right rear axle 841, brushes 421 and 429, and an oil-tight electrode cover 429.

Figure 7B:
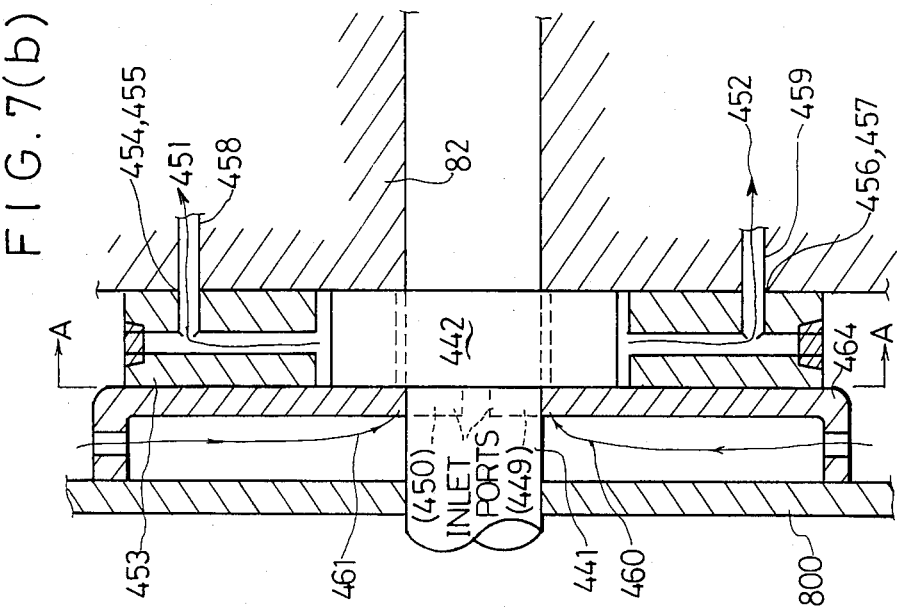
FIG. 7(b) is a longitudinal sectional view of the hydraulic pump of FIG. 7(a)
Figure 7A:
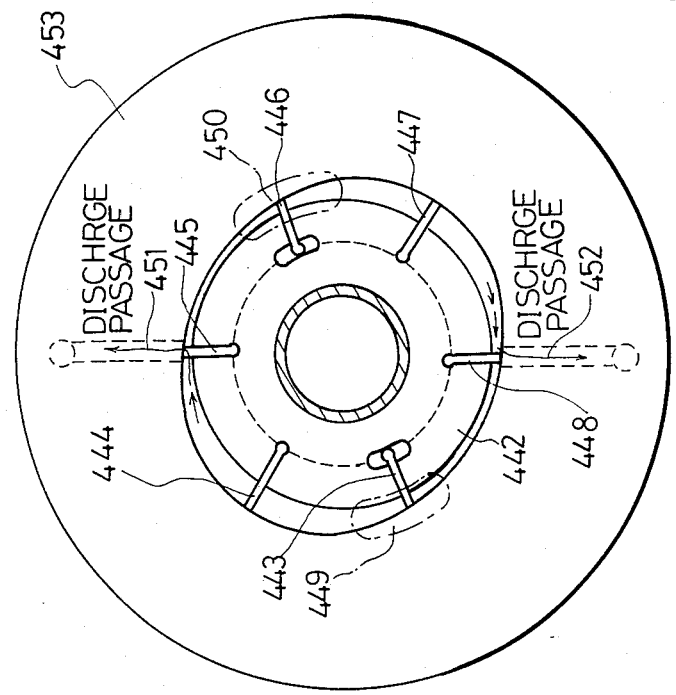
FIG. 7(a) is a cross-sectional view of a hydraulic pump employed in the embodiment of FIG. 2.
Figure 9:
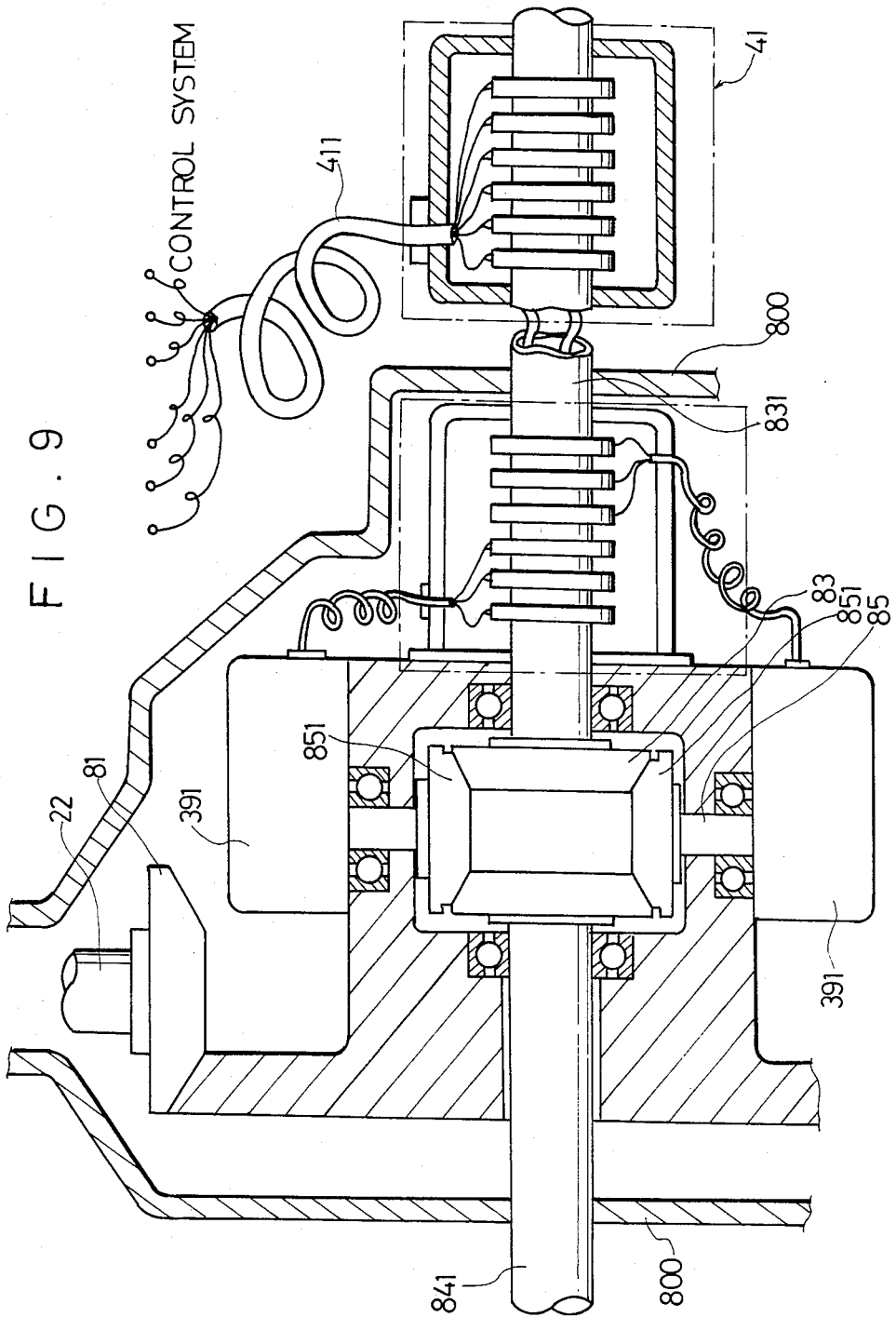
FIG. 9 is a sectional view of the automobile differential gear system employed in a second embodiment of the present invention.

The hydraulic crcuit 44 comprises the hydraulic pump 440 formed between the oil pan 800 and the differential gear case 82, a hydraulic control valve module 470, namely, an assembly of hydraulic control valves, and the hydraulic motor 480. The construction of the hydraulic pump 440 will be described with reference to FIGS. 7(a) and 7(b). FIG. 7(b) is a longitudinal sectional view of the hydraulic pump 440, and FIG. 7(a) is a cross-sectional view taken along line A—A of FIG. 7(b) as viewed in the direction of arrows. In FIG. 7(a), as a rotor 442 fixed to the differential gear case 82 rotates clockwise, vanes 443 to 448 mounted on the rotor 442 slide along the inner surface of a cam ring 453 fixed to a pump case 464. The pump case 464 is fixed to the oil pan 800 holded by the automobile body.

As in the well-known rotary vane pump, the morphology of the inner surface of the cam ring 453 is formed so that the oil sucked in through inlet ports 449 and 450 is pressurized, and then the pressurized oil is discharged into discharge passages 451 and 452 respectively. As illustrated in FIG. 7(b), outlet ports 454 and 456 formed in the cam ring 453 coincides simultaneously with inlet ports 455 and 457 and the pressurized oil is introduced into both oil passages 458 and 459 respectively. Since the oil passsages 458 and 459 communicate with each other, the pressurized oil flows through both the oil passages 451 and 452 into the inlet port of the hydraulic control valve module 470. The hydraulic pump 440 sucks the oil through an oil passage 460 and the inlet port 449 and through an oil passage 461 and the inlet port 450.

FIG. 8 illustrates the hydraulic circuit 44 and the pulse generator 482 connected to the pinion shaft 85.

The hydraulic circuit 44 includes the hydraulic pump 440 which produces a hydraulic pressure when the differential gear case 82 rotates, a hydraulic motor 480 which drives the pinion shaft 85 and a pulse generator 47 for detecting the speed of rotation of the pinion shaft 85.

The hydraulic control valve module 470 includes a relief valve 471 for regulating the pressure of oil, an unload valve 472 for controlling the vent circuit of the relief valve 471, a directional control valve 473 for controlling the direction of rotation of the hydraulic motor 480, and a safety valve 474 for controlling the torque of the hydraulic motor 480.

The hydraulic motor 480 is capable of rotating the output shaft thereof in both directions. The output shaft of the hydraulic motor 480 is connected to the pinion shaft 85. The pulse generator 482 generates pulses according to the rotation of the pinion shaft 85.

Figure 11:
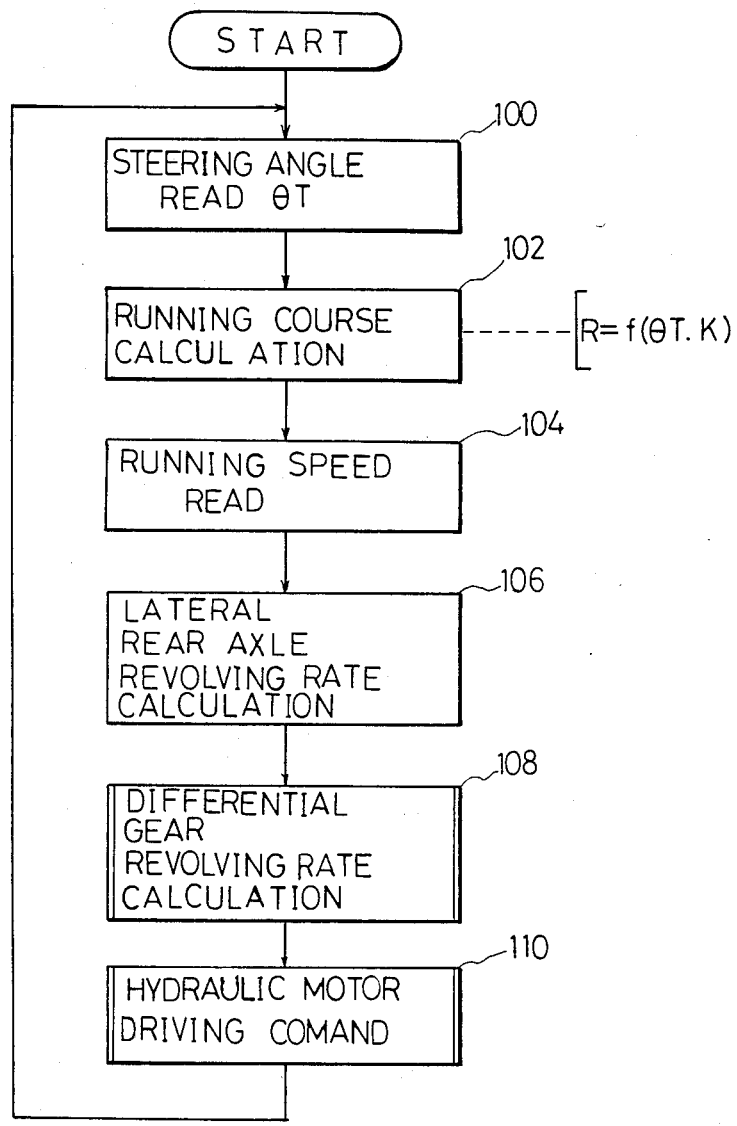
FIGS. 11 and 12 are flow charts of the routines of computer programs employed in the first embodiment of the present invention.

The function of the first embodiment will be described hereinafter with reference to flow charts of the routines of a computer program. FIG. 11 is a flow chart showing a routine of the computer program employed in the first embodiment of the present invention.

Upon the throwing-in of the ignition starter switch, the computer executes Step 100. At Step 100 through 104, the computer calculates data for driving the pinion driving unit 40. At Step 100, a steering angle $\theta T$ is read from the buffer, and the radius R of an expected circle of running course is calculated on the basis of the steering angle $\theta t$ and a vehicle form parameter K relating, for example, to the overall width and the wheel base, by the use of an expression:

$$R = f(\theta T, K) \tag{1}$$

at Step 102. In this embodiment, when the automobile is running along a straight line, $R = \infty$ or $R >> RO$. After the completion of a predetermined process, the running speed detecting unit 21 reads the average running speed in a period from a time from two seconds before this moment to this moment from the buffer, and then a revolving rate NO rpm of the propeller shaft corresponding to the average running speed is calculated at Step 104. At Stép 106, the respective revolving rates NR and NL per unit time, for example, per minute, of the right and left rear axles necessary to enable the automobile to run smoothly are calculated on the basis of the data of the expected circle of running course and the running speed.

Figure 12:
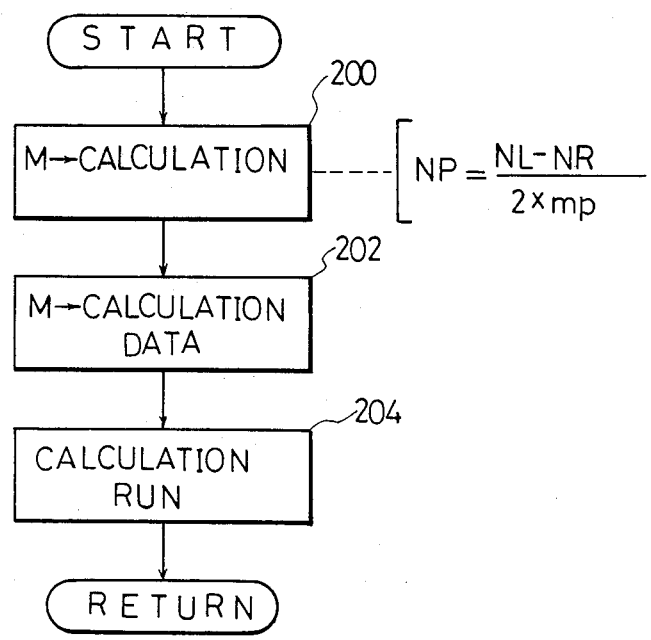

Then, at Step 108, a subroutine of FIG. 12 is executed to calculate a speed of rotation NP of the pinion shaft 85 required to provide the revolving rates NR rpm and NL rpm of the right and left rear axles when the revolving rate of the propeller shaft is NO rpm, and a direction of rotation of the pinion shaft 85.

Figure 10:
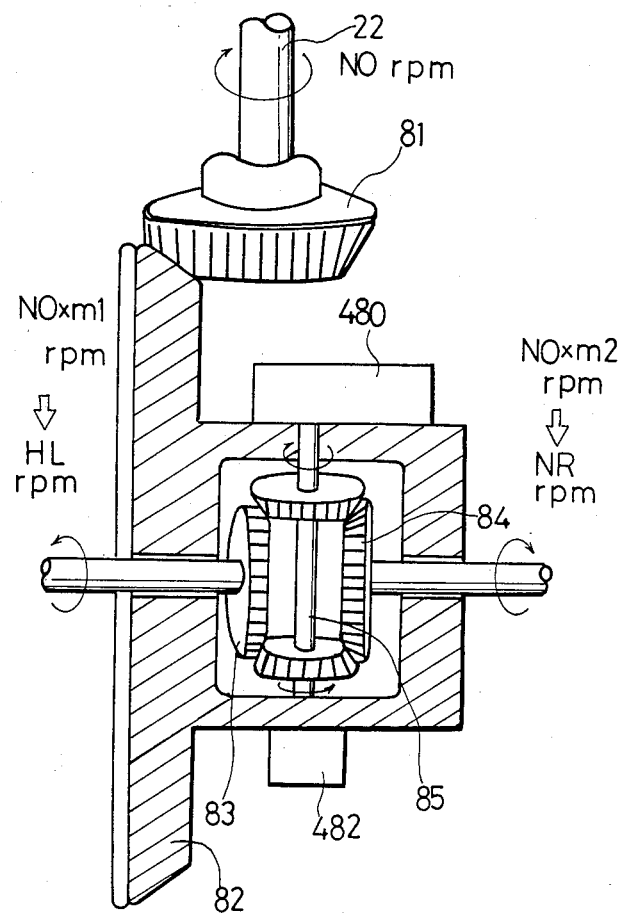
FIG. 10 is a schematic illustration for assistively explaining the relation between the revolving speed the right and left rear axles and the pinion speed of the pinions of the differential gear employed in the first embodiment.

In FIG. 12, an expression for calculating NP is read from a memory. A process of deriving expression for calculating NP will be described hereinafter with reference to FIG. 10.

The rotation of the propeller shaft 22 is transmitted through a gear wheel 81 to the differential gear case 82. When the revolving rate of the propeller shaft 22 is NO rpm, the revolving rate of the differrential gear case 82 is NO x m1, where m1 is the ratio of the number of teeth of the gear wheel 81 to that of the gear of the differential gear case 82.

Suppose that the revolving rates NR rpm and NL rpm of the right and left rear axles are obtained for smooth running along the expected running course by rotating pinion shaft 85 rightward at NP rpm, and the ratio of the number of teeth of the pinion shaft 85 to that of the gear wheel of the differential bear is m2, then, $$NL = NO \times m1 + NP \times m2 \tag{2}$$

$$NR = NO \times m1 - NP \times m2 \tag{3}$$

Subtracting Expression (2) from Expression (1), we obtain $$NL - NR = 2NP \times m2 \quad (4)$$

Therefore $$NP = (NL - NR)/(2 \times m2) \quad (5)$$

For example, when NL=8, NR=5 and m2=0.25, NP=6, and hence an appropriate differential motion is carried out by rotating the pinion shaft 85 rightward at 6 rpm, and when NL=5, NR=8 and m2=0.25, NP= −6, and hence an appropriate differential motion is carried out by rotating the pinion 486 leftward at 6 rpm.

Referring to FIG. 2, Expression (4) for calculating the speed of rotation of the pinion 486 is read from the memory at Step 200, necessary data is set at Step 202, and the value and direction of NP is decided at Step 204. Then, the routine returnes to the main routine.

After the speed of rotation of the pinion 486 has been calculated at Step 108, the hydraulic motor 480 is rotated at a predetermined revolving rate to drive the pinion shaft 85 at Step 110.

In this embodiment, the revolving rate of the hydraulic motor 480 is controlled according to the duty control system, however, a so-called electromagnetic flow control valve which controls the flow rate of the oil according to an electric signal may be provided in the return passage of the directional control valve 473. Furthermore, the pulse generator 482 is provided to control the revolving rate of the hydraulic motor 480.

A second embodiment of the present invention will be described hereinafter. The function of the second embodiment is substantially the same as that of the first embodiment.

The first embodiment is provided with the steering angle detecting unit and the running speed detecting unit, and is capable of accurately calculating the appropriate revolving rates of the rear axles for the automobile to run along an expected running course, and of controlling the pinion shaft of the differential gear by means of the hydraulic circuit so that the pinion shaft is rotated by a sufficient torque and at an appropriate speed of rotation, and hence the automobile is allowed to run smoothly. It is also possible to stop the rotation of either the right rear axle or that of the left rear axle completely by appropriately operating the directional control valves 472, 473 and 474 of the hydraulic circuit, and hence the automobile is able to escape easily even if one of the rear wheel falls off the road.

The second embodiment employs a step-motor 391 for driving the pinion 851 of the differential gear. Therefore, the second embodiment is able to control the speed of rotation of the pinion highly accurately and quickly.

It is apparent from what has been described hereinbefore, according to the present invention, that the differential motion of the differential gear is controlled positively according to a steering angle, and hence the sensitivity and response of changing running direction to steering operation are improved. Accordingly, the present invention enables an automobile to run safely on a frozen road reduces the minimum turning radius of the automobile.

Although the present invention has been described with reference to the preferred embodiment thereof with a certain degree of particularity, it is obvious to those skilled in the art that many modifications and variation of the present invention are possible in the light of the above teachings. It is therefore to be understood that the present invention may be practiced otherwise than as specifically described within the spirit and scope thereof.

What is claimed is:

1. An automobile differential gear system comprising:
    a differential gear including a differential gear case to which a torque of the propeller shaft is transmitted through a gear wheel, pinions mounted on said differential gear case for revolution together with the differential gear case and for rotation on their axes, and gear wheels capable of being rotated by the composite rotative action of the rotation of the pinions and the revolution of the differential gear case;
    a steering angle detecting unit for detecting a steering angle;
    a driving speed detecting unit for detecting the revolving speed of the differential gear case;
    a pinion speed control unit which receives signals from the steering angle detecting unit and the driving speed detecting unit and provides a control signal corresponding to the input signals for controlling the differential rotation of the right and left gear wheels; and
    a pinion driving unit for rotating the pinions to control the respective revolving speed of the right and the left gear wheels according to the control signal given thereto by the pinion speed control unit.

2. An automobile differential gear system according to claim 1,
    wherein said pinion driving unit is disposed on the outer surface of said differential gear case, and includes an electric motor for driving said pinion disposed within said differential gear case.

3. An automobile differential gear system according to claim 1,
    wherein said pinion driving unit is incorporated into a rear axle of the automobile, and includes slip rings which rotate together with said rear axle, and brushes disposed in sliding contact with the slip rings for transmitting electric signals.

4. An automobile differential gear system according to claim 1,
    wherein said pinion driving unit includes a hydraulic pump having a rotor capable of rotating together with said differential gear case, and capable of sucking oil and supplying the pressurized oil to a hydraulic circuit, and a hydraulic motor driven by the pressurized oil supplied thereto from the hydraulic pump to drive the pinion.

* * * * *